(12) United States Patent
Erkip et al.

(10) Patent No.: US 8,228,836 B2
(45) Date of Patent: Jul. 24, 2012

(54) COOPERATIVE MAC FOR RATE ADAPTIVE RANDOMIZED DISTRIBUTED SPACE-TIME CODING

(75) Inventors: Elza Erkip, New York, NY (US);
Thanasis Korakis, Brooklyn, NY (US);
Pei Liu, Forest Hills, NY (US);
Shivendra S. Panwar, Freehold, NJ (US); Anna Scaglione, Davis, CA (US)

(73) Assignee: Polytechnic Institute of New York University, Brooklyn, NY (US)

( * ) Notice: Subject to any disclaimer, the term of this patent is extended or adjusted under 35 U.S.C. 154(b) by 473 days.

(21) Appl. No.: 12/479,563

(22) Filed: Jun. 5, 2009

(65) Prior Publication Data

US 2010/0014453 A1  Jan. 21, 2010

Related U.S. Application Data

(60) Provisional application No. 61/059,032, filed on Jun. 5, 2008.

(51) Int. Cl.
*H04B 7/14* (2006.01)
(52) U.S. Cl. ...................................... 370/315
(58) Field of Classification Search ........................ None
See application file for complete search history.

(56) References Cited

U.S. PATENT DOCUMENTS

| 7,684,337 B2 * | 3/2010 | Mehta et al. .................. 370/238 |
| 7,995,512 B2 * | 8/2011 | Kim et al. ...................... 370/315 |
| 2006/0077942 A1 * | 4/2006 | Panwar et al. ................ 370/338 |
| 2007/0160014 A1 * | 7/2007 | Larsson ......................... 370/338 |
| 2008/0137585 A1 * | 6/2008 | Loyola et al. ................. 370/315 |
| 2008/0225774 A1 * | 9/2008 | Kim et al. ...................... 370/315 |
| 2009/0147746 A1 * | 6/2009 | Alay et al. ..................... 370/329 |
| 2009/0175214 A1 * | 7/2009 | Sfar et al. ...................... 370/315 |
| 2009/0233544 A1 * | 9/2009 | Oyman et al. .................... 455/7 |
| 2011/0211618 A1 * | 9/2011 | Oyman et al. ................ 375/211 |

FOREIGN PATENT DOCUMENTS

WO  WO 2007/140437  12/2007

* cited by examiner

*Primary Examiner* — Anh-Vu Ly
(74) *Attorney, Agent, or Firm* — John C. Pokotylo; Straub & Pokotylo

(57) ABSTRACT

Data is transmitted from a source wireless device to a destination wireless device by: (a) discovering node-to-node wireless channel conditions in a wireless network; (b) determining at least one of (A) wireless relay devices, (B) modulation schemes, and (C) transmission rates using the discovered node-to-node channel conditions; (c) signaling at least some of the determined information to the determined wireless relay devices; (d) receiving, with each of the wireless relay devices, a transmission of the data from the source wireless device; and (e) transmitting, with each of the wireless relay devices, a randomized, space-time encoded, part of the received data, to the destination device using the signaled at least some of the determined information.

2 Claims, 6 Drawing Sheets

COOPERATIVE MAC FOR RATE ADAPTIVE RANDOMIZED DISTRIBUTED SPACE-TIME CODING

§0.1 RELATED APPLICATIONS

Benefit is claimed to the filing date of U.S. Provisional Patent Application Ser. No. 61/059,032 ("the '032 provisional"), titled "COOPERATIVE MAC FOR RATE ADAPTIVE RANDOMIZED DISTRIBUTED SPACE-TIME CODING," filed on Jun. 5, 2008 and listing Elza ERKIP, Thanasis KORAKIS, Pei LIU, Shivendra S. PANWAR and Anna SCAGLIONE as inventors. The '032 provisional is incorporated herein by reference. However, the scope of the claimed invention is not limited by any requirements of any specific embodiments described in the '032 provisional.

§0.0 GOVERNMENT RIGHTS

The United States Government may have certain rights in this invention pursuant to a grant awarded by the National Science Foundation. Specifically, the United States Government may have a paid-up license in this invention and the right in limited circumstances to require the patent owner to license others on reasonable terms as provided for by the terms of Award No. 0520054 awarded by the National Science Foundation (Division of Computer and Network Systems).

§1. BACKGROUND OF THE INVENTION

§1.1 Field of the Invention

The present invention concerns wireless communications. In particular, the present invention concerns cooperative wireless communications used to improve data throughput, reliability, and/or range.

§1.2 Background Information

In a typical wireless network, each transmitter is surrounded by several other stations (or more generally, nodes or devices). However, usually, only the link between the sender device and the receiver device is used to send the data. In a fading environment, data transmission over this link might not be reliable. For example, deep fading and interference may cause signal corruption, which results in the data getting lost.

Cooperative wireless communication techniques provide a potential solution by recruiting relays or helpers. When a relay is employed, the possibility of losing data or receiving inaccurate data decreases. (See, e.g., the articles: A. Sendonaris, E. Erkip, and B. Aazhang, "User Cooperation Diversity-Part I: System Description," *IEEE Trans. on Communications*, Vol. 51, No. 11, pp. 1927-1938 (November 2003) (incorporated herein by reference); A. Sendonaris, E. Erkip, and B. Aazhang, "User Cooperation Diversity—Part II: Implementation Aspects and Performance Analysis," *IEEE Trans. on Communications*, Vol. 51, No. 11, pp. 1939-1948 (November 2003) (incorporated herein by reference); J. N. Laneman, G. W. Wornell, and D. N. C. Tse, "An Efficient Protocol for Realizing Cooperative Diversity In Wireless Networks," *ISIT* 2001, p. 294 (June 2001) (incorporated herein by reference); and J. N. Laneman, D. Tse, and G. Wornell, "Cooperative Diversity In Wireless Networks: Efficient Protocols and Outage Behavior," *IEEE Transactions on Information Theory*, Vol. 50, No. 12, (December 2004) (incorporated herein by reference).)

While cooperative communications is actively researched in the physical layer ("PHY"), modifications to the higher layer protocol stack are needed to discover and utilize all relays. Previous work by at least some of the present inventors presented a cooperative MAC protocol for IEEE 802.11. (See, e.g., the references: P. Liu, Z. Tao, and S. Panwar. "A Cooperative MAC Protocol for Wireless Local Area Networks," *IEEE Intl. Conf. on Communications* (Seoul, Korea, June 2005) (incorporated herein by reference); T. Korakis, Z. Tao, Y. Slutskiy, and S. Panwar, "A Cooperative MAC Protocol for Ad-Hoc Wireless Networks", *PWN07*, (White Plains, N.Y., March 2007) (incorporated herein by reference); and S. Panwar, P. Liu and Z. Tao, "Cooperative Wireless Communications", U.S. Pat. No. 7,330,457 (incorporated herein by reference).) Each packet is transmitted over two hops, first from the source to the relay and then from the relay to destination. These references demonstrated that the network performance metric, such as throughput and delay performance can be greatly improved by using cooperation.

Typically, there might be more than one device (or node) that can "overhear" a packet sent by a source device. If such devices are willing and able to transmit cooperatively to the destination device, cooperative diversity can be much larger than in the case of a single relay. However, if all relay devices transmit sequentially in time, the time required to complete transmission increases linearly with the number of relay devices. Thus, although using more relay devices increases diversity, network throughput, which is measured by the number of bits successfully received in a unit time, may actually decrease when the system employs a lot of relay devices.

Recent advances in Multi-Input Multi-Output ("MIMO") systems allow multiple antennas to transmit together to achieve high diversity gains using space-time coding ("STC"). Hence, multiple relay devices may be used as a distributed antenna array to mimic a MIMO system. In fact, the spatial diversity obtained by cooperation increases linearly with the number of relays. Simultaneous transmission of multiple relay devices that decode the source information at the PHY layer can be accomplished by a distributed space-time code ("DSTC"). (See, e.g., J. N. Laneman, D. Tse, and G. Wornell, "Cooperative Diversity In Wireless Networks: Efficient Protocols and Outage Behavior," *IEEE Transactions on Information Theory*, Vol. 50, No. 12, (December 2004) (incorporated herein by reference).) FIG. 1 illustrates such a transmission. The basic idea is to coordinate and synchronize the relay devices so that each relay device acts as one antenna of a regular STC. (See, e.g., the articles: V. Tarokh, H. Jafarkhani, and A. Calderbank, "Space-Time Block Codes from Orthogonal Designs," *IEEE Transactions on Information Theory*, Vol. 45, No. 5, pp. 1456-1467 (July 1999) (incorporated herein by reference); and S. Alamouti, "A Simple Transmit Diversity Technique for Wireless Communications," *IEEE Journal on Selected Areas in Communications*, Vol. 16, No. 8, pp. 1451-1458 (October 1998) (incorporated herein by reference).)

Unfortunately, however, DSTC poses a number of challenges from a system perspective. Each relay participating in a DSTC needs to be assigned a number (and each relay must know of its number) so that it knows exactly which antenna it will mimic in the underlying STC. Further, DSTC does not fully exploit all available relay devices because even though stations other than the chosen relay devices may decode the source information correctly, they are not allowed to transmit. This sacrifices potential diversity and coding gains. Also, each individual link between the source and the relay might not be reliable due to noise, interference, and/or mobility. If one of the relay devices does not receive the signal from the source device, it cannot forward it in the next hop, which degrades the diversity gain of the system.

The application of DSTC communications in mobile ad hoc networks has been discussed in the article, G. Jakllari, S. V. Krishnamurthy, M. Faloutsos, P. V. Krishnamurthy, and O. Ercetin, "A Framework for Distributed Spatial-Temporal Communications in Mobile Ad hoc Networks," *IEEE INFOCOM*, (Barcelona, Spain, April 2006) (incorporated herein by reference).

In that article, the source device can only recruit a fixed number of relay devices. The source device transmits a packet in the first hop and expects a busy tone signal from each of the relay devices sent sequentially in time. Even if a single relay device does not receive the packet from the source device, and consequently fails to respond with a busy tone, the source device transmits directly to the destination device rather than rely on the recruited relay devices.

Thus, it would be useful to improve the known DSTC systems.

§2. SUMMARY OF THE INVENTION

Exemplary embodiments consistent with the present invention provide a layer-2 protocol to (1) discover node-to-node channel conditions in a wireless network, (2) determine values for randomized distributed space-time coding ("R-DSTC") techniques which alleviate at least some of the foregoing problems of known DSTC systems, and (3) signaling the determined values to relay devices. Each relay device transmits a random, linear combination of antenna waveforms.

Thus, at least some exemplary embodiments consistent with the present invention provide a MAC (layer 2—data link) protocol to support R-DSTC. Such exemplary embodiments might provide a signaling protocol which enables discovery of neighboring relays for a generic wireless network (including infrastructure based networks and mobile ad hoc networks). A source device can then "recruit" relay devices, as needed. The recruited relay devices can then relay, cooperatively, information received from the source device to the destination device. The recruited relay devices may do so using R-DSTC and a modulation scheme assigned by the source device.

At least some exemplary embodiments consistent with the present invention may adapt the transmission rate. Such rate adaptation might use at least one of (A) the number of relay devices available, (B) a more complete estimate of network information, and (C) destination device receiver feedback. In a dense network, exact knowledge of channel conditions is not required for R-DSTC to reach its full potential.

§3. BRIEF DESCRIPTION OF THE DRAWINGS

Figure 3:
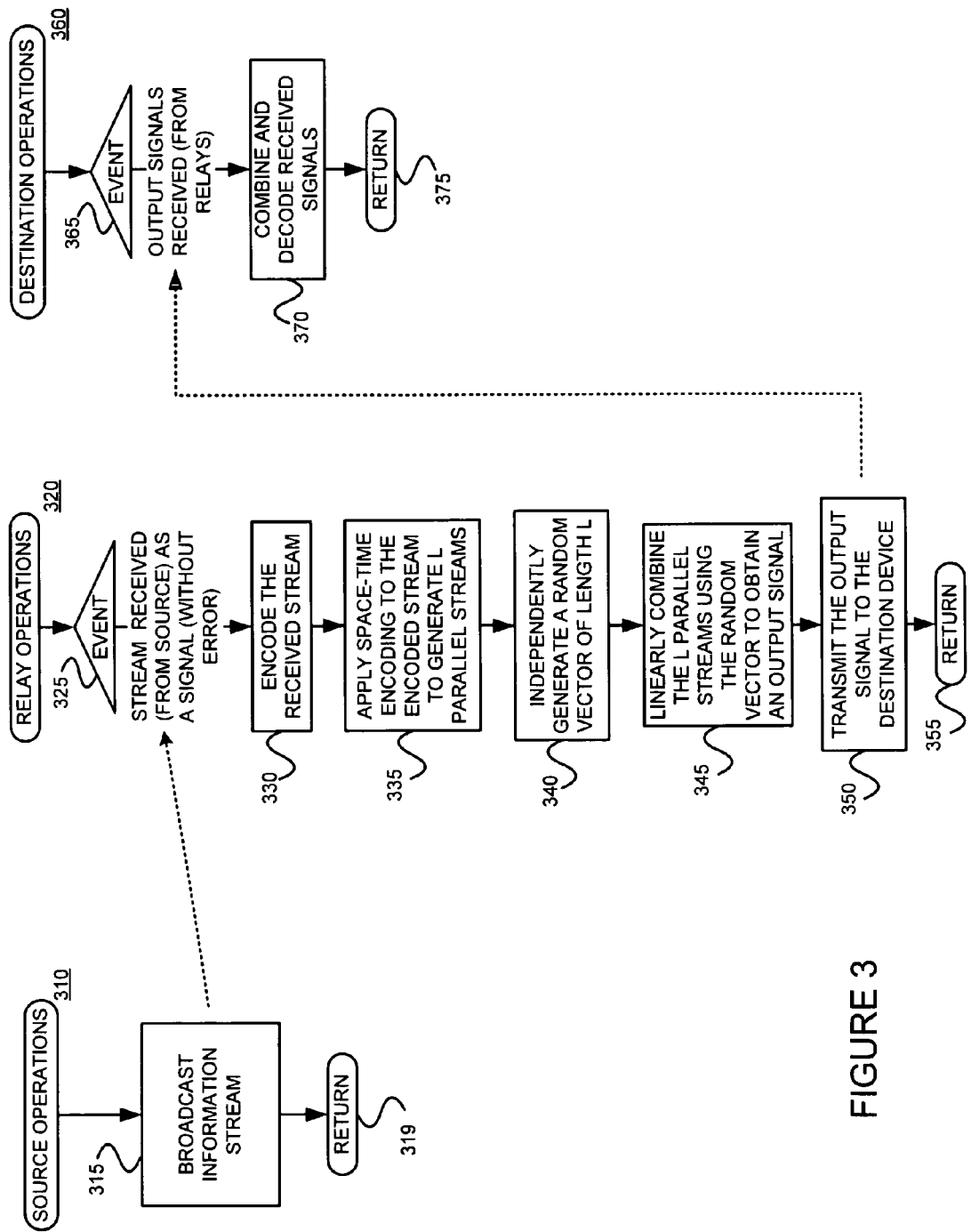

FIG. 3 includes flow diagrams of exemplary operating methods, consistent with the present invention, of a source device, each of a plurality of relay devices, and a destination device.

Figure 4:
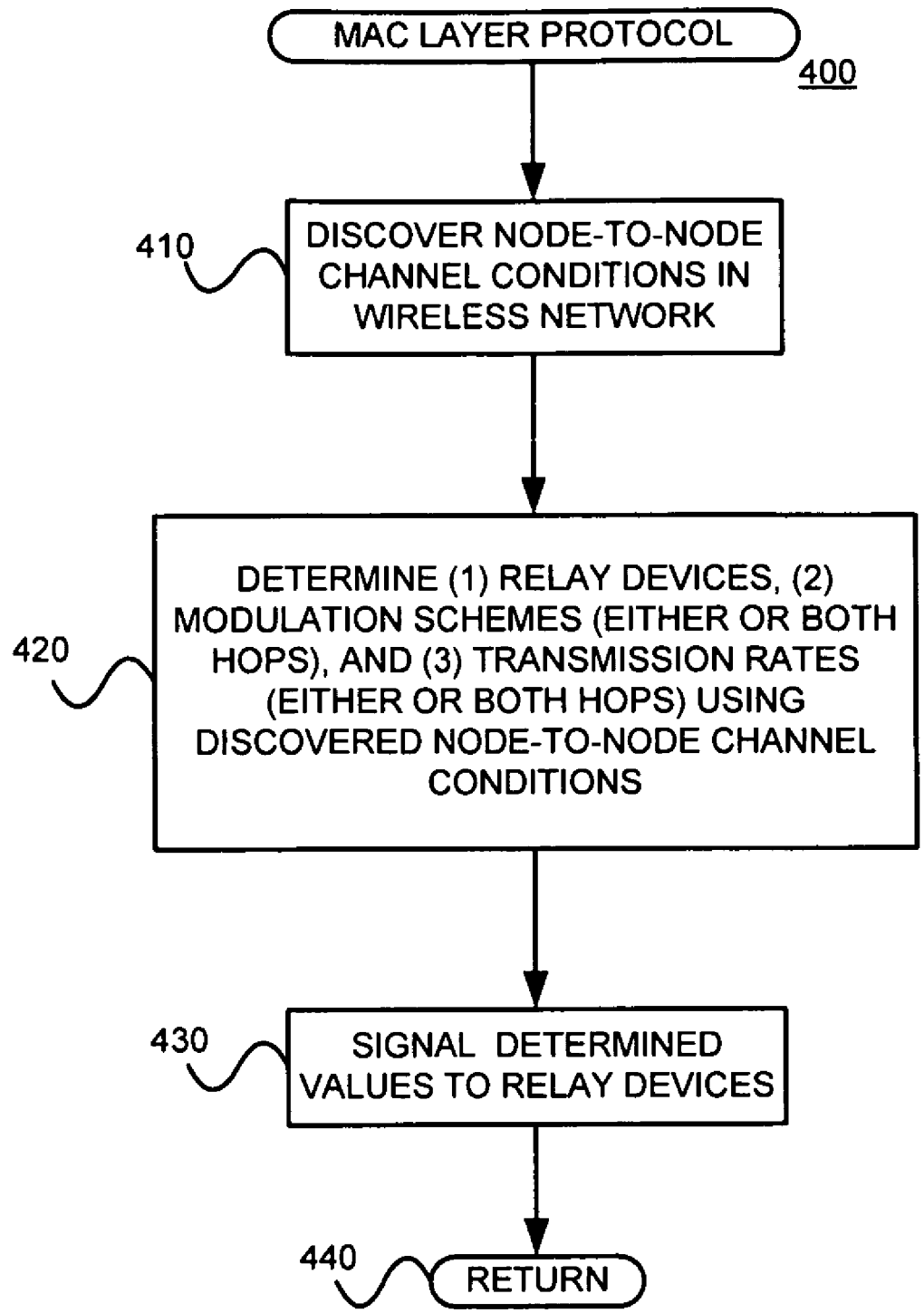

FIG. 4 is a flow diagram of an exemplary MAC layer protocol consistent with the present invention.

Figure 5:
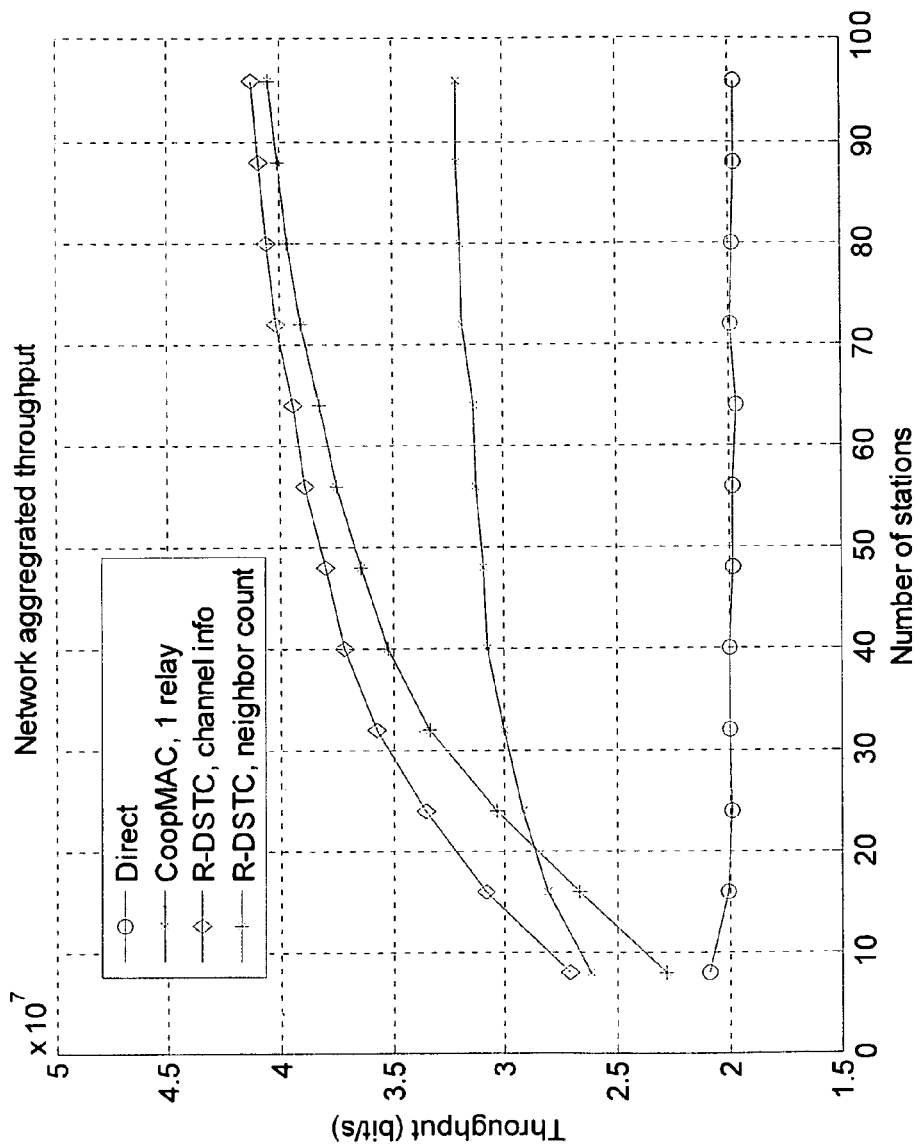

FIG. 5 illustrates simulations of how network throughput depends on the number of relay devices under various transmission techniques.

Figure 6:
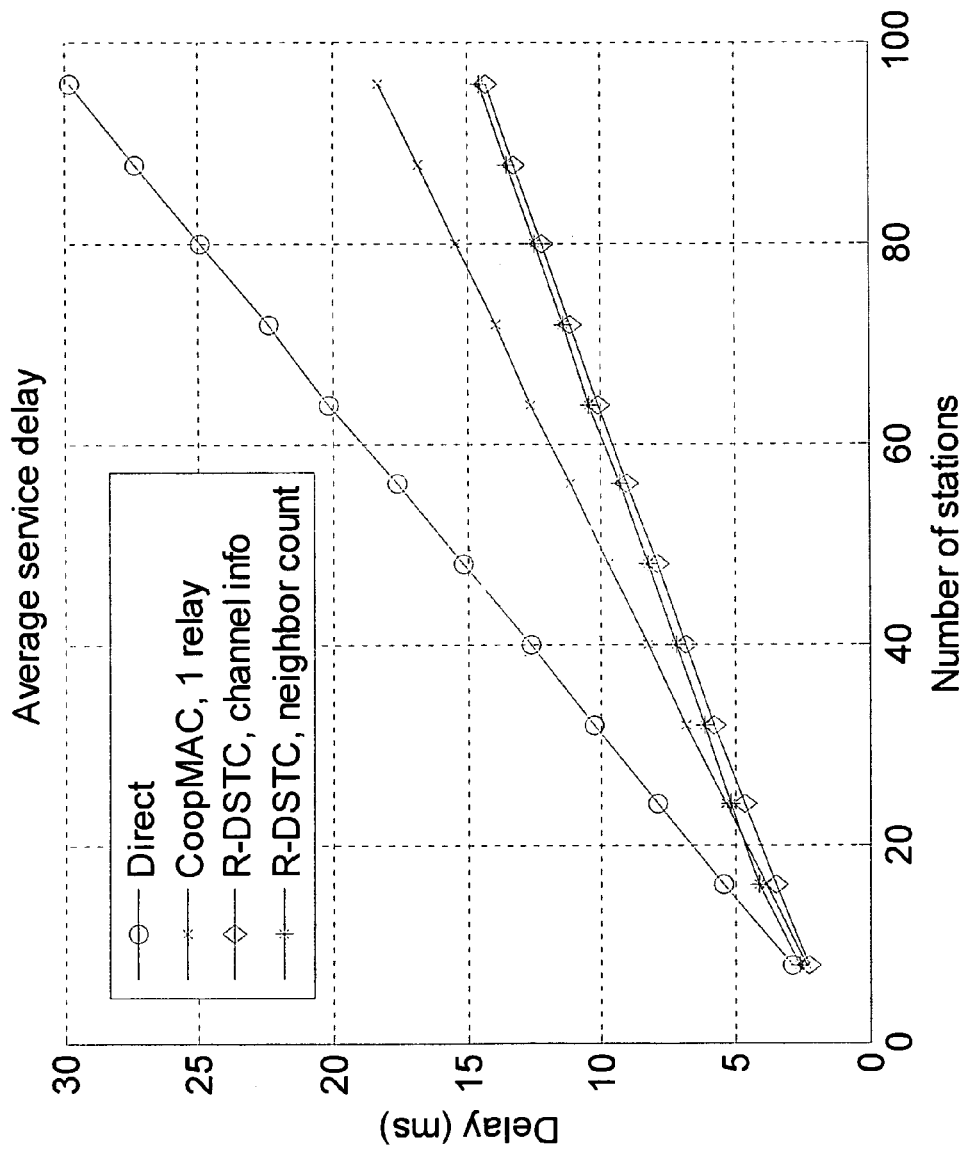

FIG. 6 illustrates simulations of how service delay depends on the number of relay devices under various transmission techniques.

§4. DETAILED DESCRIPTION

Figure 1:
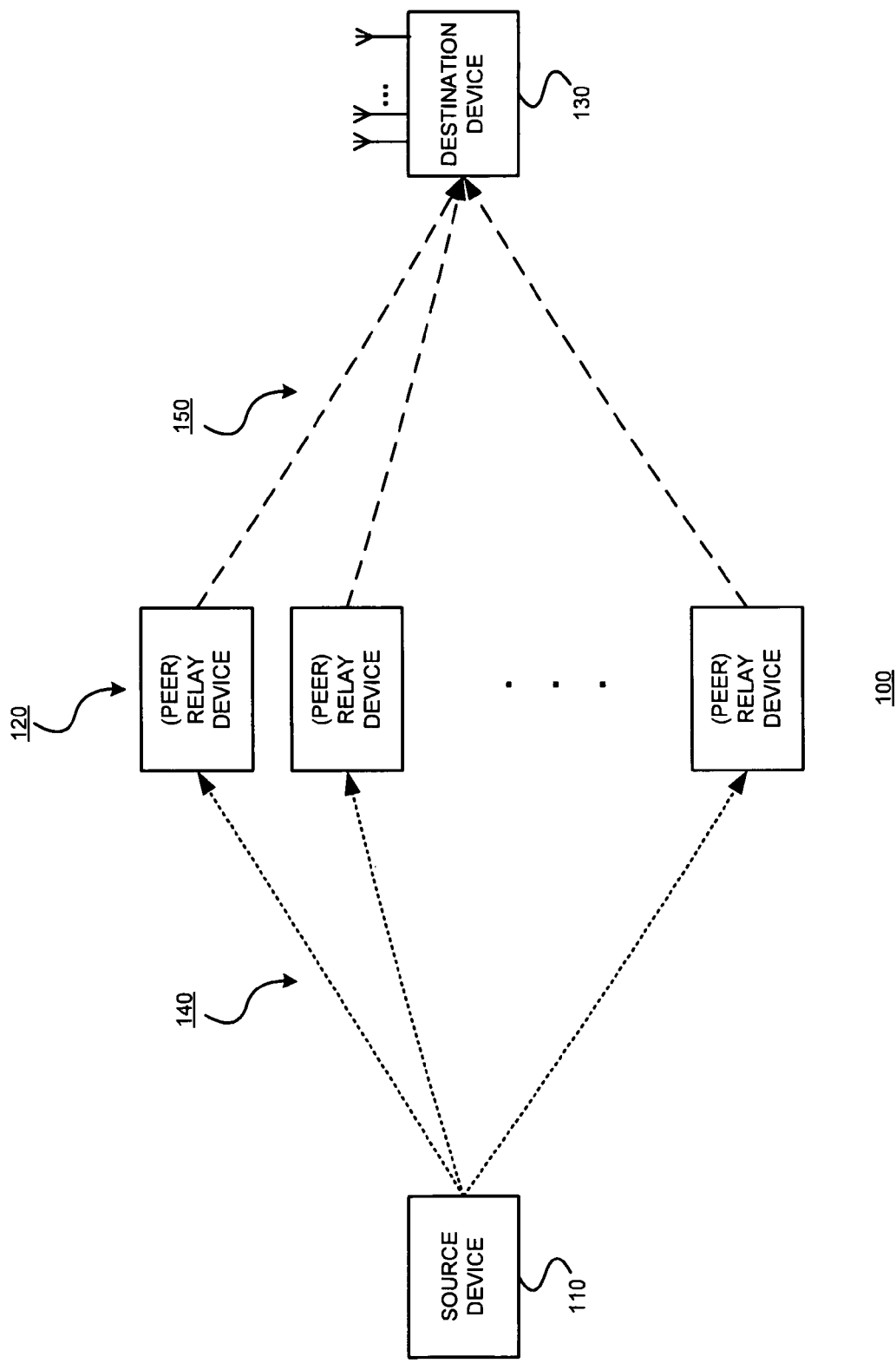
FIG. 1 illustrates an exemplary environment in which embodiments consistent with the present invention may operate.

§4.1 Exemplary Environment in Which Embodiments Consistent with the Present Invention May Operate FIG. 1 illustrates an exemplary environment 100 in which embodiments consistent with the present invention may operate. As shown, the environment 100 includes a source device 110, a plurality of (e.g., peer) relay devices 120 and a destination device 130. Assume that the destination device 130 includes a plurality of (L) antennas.

As shown by lines 140, to maximize spatial multiplexing gain, the source device 110 first broadcasts a data packet (or more generally, an information stream) for receipt by each relay device 120. Then, as shown by lines 150, the relay devices 120 transmit cooperatively to the destination device 130 in parallel, thereby achieving a high spatial multiplexing gain.

§4.2 Exemplary Relay Architecture

Figure 2:
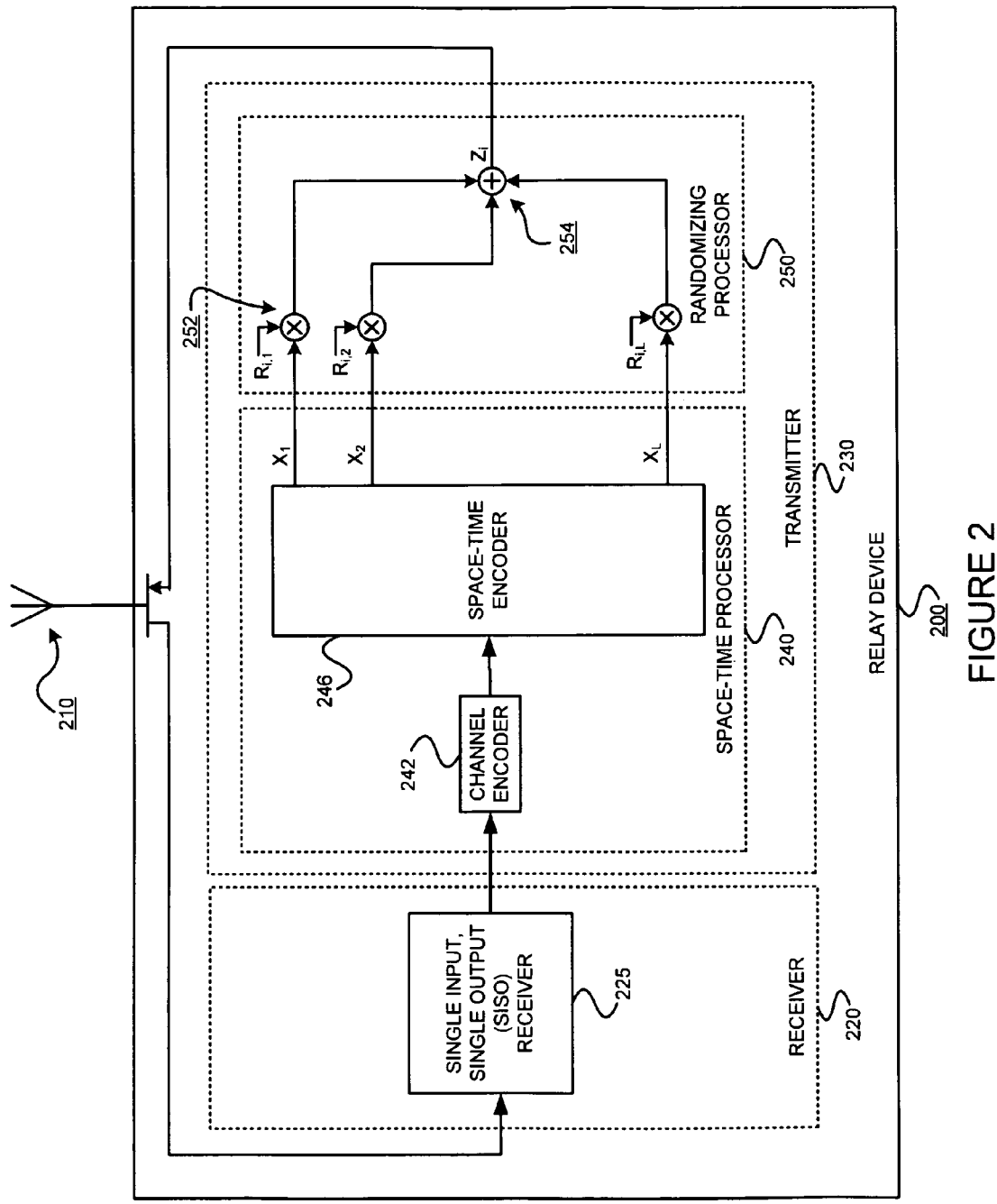
FIG. 2 is a block diagram of an exemplary relay device architecture consistent with the present invention.

FIG. 2 is a block diagram illustrating an architecture of an exemplary relay device 200 consistent with the present invention. The exemplary relay device 200 may include a transmit/receive antenna 210, a receiver portion 220 and a transmitter portion 230.

The receiver portion 220 includes a single-input-single-output ("SISO") receiver 225 which accepts a signal received by antenna 210 (from source device), and which outputs a (e.g., serial) signal to the transmitter 230.

The transmitter portion 230 includes a space-time processor 240 followed by a randomizing processor 250. The space-time processor 240 may be a known STC processor and may use known STC processing techniques. On the other hand, the use of the randomizing processor 250 in the context illustrated is new and advantageous.

The space-time processor includes a channel encoder 242 and a space-time encoder 246. Basically, the serial output signal of the SISO receiver is encoded by the channel encoder 242 to generate an encoded signal. The space-time encoder 246 accepts the encoded signal and outputs a plurality of (L) signals ($X_1$ through $X_L$).

The relay device 200 may include a device for generating a random vector of length L, where each component of the random vector of the $i^{th}$ relay device 200 is denoted as $R_{i,1}$ through $R_{i,L}$ as shown. Each of the L outputs of the space-time encoder 246 is mixed with each component of the random vector with mixers 252. The L outputs of the L mixers 252 are then combined by combiner 254 to obtain an output signal ($Z_i$). The output signal $Z_i$ is then transmitted for reception by the destination device. Each of the plurality of relay devices will therefore transmit, simultaneously (or effective simultaneously), a random linear combination of all the L streams. Note that if the received information stream is B bits, the output signal $Z_i$ will be B/L bits.

Note that FIG. 2 only depicts the signal processing providing relaying functionality. In principle, all devices can act as source device, relay device, and/or destination device, as needed, for each packet. That is, dedicated relay devices and separate hardware architecture for the relay devices are not required.

At least some embodiments consistent with the present invention may be implemented in hardware (e.g., integrated circuits, application specific integrated circuits, programmable logic or gate arrays, etc.), and/or software (e.g., program instructions stored in memory such as a RAM, ROM, etc., and/or stored on a storage device such as a magnetic or optical disk, etc., executed on a general purpose processor such as a microprocessor).

§4.3 Exemplary Methods

FIG. 3 includes flow diagrams of exemplary operating methods 310, 320, and 360, consistent with the present invention, of a source device, each of a plurality of relay devices, and of a destination device, respectively. Each packet (or more generally, information stream) transmission from source device to destination device occurs in two steps. Referring to the left side of FIG. 3, in the first step, the source device broadcasts its packet (or information stream) for reception by its (peer) relay devices. (Block 315)

Referring back to blocks 315 and 325, in at least some embodiments consistent with the present invention, the source device may append a frame checksum ("FCS") to the sourced packet. In such a case, each relay device receiving the packet first tries to decode the packet and verify the FCS to see if it received the packet correctly. Each relay device will participate in the cooperative transmission only if it receives correct information.

Referring now to the middle of FIG. 3, in the second step, M cooperative relay devices (acting as virtual antennas) transmit together in parallel and in synchronization. Each of the relay devices might include a transceiver architecture such as described above with reference to FIG. 2. Referring to FIG. 3, upon receipt of the packet (or information stream) (event 325) each relay device encodes (e.g., with a channel encoder) the received packet or information stream (Block 330). Space-time encoding is then applied to the encoded stream to generate L parallel streams (Block 335). (Recall 246 of FIG. 2.)

Instead of letting each relay device pick a unique data stream from the output of the coordinate system (as is the case with known systems), the $i^{th}$ relay device independently generates a random vector $r_i$ of length L (Block 340) and generates a linear combination of the L data streams using the random vector to form an output signal (Block 345). (Recall, e.g., 250 of FIG. 2.) The method 320 then transmits the output signal to the destination device. (Block 350)

Referring now to the right side of FIG. 3, when destination operations 360 receive output signals from the relays (event 365), they combine and decode the received signals (Block 370).

As can be appreciated from the foregoing, the cooperative transmission of a packet takes two time slots as described in the reference P. Liu, Z. Tao, and S. Panwar. "A Cooperative MAC Protocol for Wireless Local Area Networks," *IEEE Intl. Conf. on Communications* (Seoul, Korea, June 2005) (incorporated herein by reference). In the first time slot, the source device S first transmits the packet to all its potential relay devices R. Assuming each packet is followed by a frame checksum (FCS) code, each relay device first tries to decode the packet and verify the FCS. In the following time slot, only the relay(s) that receive the packet correctly re-encode and send the packet to the destination device. Thus, the transmission for a packet from a source device to a destination device takes two hops, as in the reference P. Liu, Z. Tao, and S. Panwar. "A Cooperative MAC Protocol for Wireless Local Area Networks," *IEEE Intl. Conf on Communications* (Seoul, Korea, June 2005) (incorporated herein by reference). However, in the R-DSTC scheme consistent with the present invention, multiple relay devices may transmit simultaneously in the second time slot. The signals from all relay devices propagate to the destination, where they are received.

Although not shown in relay operations 320, each relay device may employ a regular single-input and single-output ("SISO") decoder to decode the information from the source packet sent in the first hop. Referring back to block 330, the relay device re-encodes the information stream received from the source.

Referring back to block 335, the output from the space-time (STC) encoder is in the form of L parallel streams, each corresponding to an antenna in a MIMO system with L transmission antennas. Assume an underlying full rank space-time code G is of size L×K. Even if each relay device only has one antenna (and therefore cannot transmit all streams in parallel), each of the relay devices transmits a different weighted sum of all the streams.

Referring back to blocks 340 and 345, for the $i^{th}$ relay at time m, the transmitted signal may be expressed as:

$$z_i(m)=E_s r_i X(m),$$

where i=1,2,...,N and m=1,2,...,K. $E_s$ is the symbol energy and $r_i=[r_{i1}, r_{i2}, ..., r_{iL}]$ is the random weight at relay i.

Each element of $r_i$ is assumed to be an independently generated random variable, such as a complex Gaussian random variable with zero mean and variance 1/L. (See, for example, the article B. S. Mergen and A. Scaglione, "Randomized Space-Time Coding for Distributed Cooperative Communication," *IEEE Transactions on Signal Processing*, pp. 5003-5017 (October 2007) (incorporated herein by reference).) Assume that there are N relays. $X(m)=[x_1(m) x_2(m) \ldots x_L(m)]^T$ includes the coded symbols from the STC encoder and is the $m^{th}$ column of the space time code G.

Referring back to 365 and 370 of FIG. 3, the destination receiver may be similar to a regular STC receiver. Assuming that N nodes participate in relaying, the received signal at the receiving antenna at the $m^{th}$ symbol time can be expressed as:

$$y(m)=HZ(m)+w(m)=E_s HRX(m)+w(m).$$

Here, H is the 1×N channel vector representing channel gain from each relay to the destination, $Z(m)=[z_1(m) z_2(m) \ldots z_L(m)]^T$ and $$R = \begin{bmatrix} r_1 \\ r_2 \\ \vdots \\ r_N \end{bmatrix}.$$

The additive Gaussian white noise is w(m) and has a power spectrum density of $N_0/2$.

Still referring to block 370 of FIG. 3, the receiver at the destination device requires channel information to achieve optimum performance using STC. However, in a real system, perfect channel information is not attainable. The channel is often estimated using pilot symbols. An interesting discovery is that, for systems consistent with the present invention, there is no need to estimate H and R separately; only the effective channel vector G:=HR is required, based on the article B. S. Mergen and A. Scaglione, "Randomized Space-Time Coding for Distributed Cooperative Communication," *IEEE Transactions on Signal Processing*, pp. 5003-5017 (October 2007) (incorporated herein by reference). By letting X=I (i.e., by letting each branch of the output of the space-time encoder transmit a pre-defined symbol sequentially in time), the received signal would be:

$$Y = E_s HR + W.$$

The regular receiver channel estimation technique for STC may be used to estimate the effective channel vector G.

Assume that the channel undergoes independent Rayleigh fading, and the random coefficient is Gaussian distributed with zero mean and variance of 1/L. The bit error probability in high SNR region can be found in the paper P. Liu, Y. Liu, T. Korakis, A. Scaglione, E. Erkip and S. Panwar, "Cooperative MAC for Rate Adaptive Randomized Distributed Space-time Coding", *IEEE Global Telecomm. Conf.* (*IEEE GLOBECOM* (New Orleans, November 2008).

A regular space-time decoder can decode the received signal as long as G is known.

§4.3.1 Exemplary Rate Adaptation

If it is desired to maximize a network layer performance metric, such as throughput and delay, the PHY layer operations have to be coupled with the activities of the MAC layer. Most wireless networks use rate adaptation to handle a range of receiving SNR at the receiver to maintain a satisfactory error probability. It is important for any device with multirate capabilities to use the channel resource efficiently. One of the criteria for rate adaptation is to keep the error rate below a pre-set threshold, while maximizing the throughput for each source device and destination device pair.

In at least some embodiments consistent with the present invention, the MAC selects the rates for both transmission hops (the source device to the relay devices, and the relay devices to the destination device). This is because the effective throughput significantly depends on the coding and modulation schemes. Generally speaking, the higher the data rate for the first hop transmission, the less time is consumed for the first hop. However, fewer devices can decode the first transmission and participate in the second hop as a relay device. Fewer relay devices means the supported data rate for the second hop is expected to be lower and, consequently, more time is consumed in the second hop. Therefore, there is a tradeoff between the data rates of the first and the second hops to maximize the throughput.

In at least some embodiments consistent with the present invention, MAC may also be used to choose a suitable STC to be used by the relay devices. For example, the MAC may also attempt to choose a STC dimension L as close as possible to the number of relay devices N to maximize diversity gains. However, practically, good space-time code only exists for a selected set of all L's. That is, some numbers work better for space-time coding than others. If L does not work well for space-time coding, some lower value (e.g., L−1) might be used instead.

In at least some embodiments consistent with the present invention, the PHY layer is designed to handle BPSK, QPSK and different size QAM constellations. The rate that the PHY layer can support is denoted as $R_p$, p=0, . . . , P, where $R_0$ is the basic rate at which the devices (nodes) exchange control information. Assume that there are M devices (nodes) in the network and each of them has a range such that the basic rate $R_0$ is decoded with high probability. Further assume that the packet header is at the basic rate $R_0$ and that the received signal strength is available at the MAC. So each device (node) can estimate the channel conditions between a pair of devices (nodes) that can communicate.

For each rate $R_p$ let $\{A_p\}_{ij} = a_{p,ij}$ be the correspondent adjacency matrix, where $a_{p,ij}=1$ means that the $i^{th}$ device (node) can communicate with device (node) j using rate p and $a_{p,ij}=0$ means that they cannot. Obviously, $A_0$ is equal to a matrix of all ones except for the diagonal terms, since all devices (nodes) are assumed to be able to communicate at the basic rate $R_0$ to their neighbors. Assume that all devices (nodes) overhear the control packet and packet header of the data packet between devices (nodes). Therefore, they can collect information to update the matrices $A_p$ whenever the opportunity of a message exchange arises. Further assume that if two devices (nodes) communicate directly, they always do so at the maximum possible rate.

As mentioned above, rate adaptation is essential to maximize the network layer performance metric. The goal is to pick the coding, modulation and space-time coding schemes for each transmission. For example, to maximize the MAC layer throughput, one could minimize the transmission time of a packet of B bits:

$$T_c = \frac{B}{R_1} + \frac{B}{R_2},$$

where $R_1$ and $R_2$ are the data rate for the first hop and the second hop, respectively.

Note that the MAC layer overhead and the bandwidth used to resolve contention are ignored here. In at least some embodiments consistent with the present invention, cooperative transmissions are employed only when cooperative transmissions take less time than direct transmissions.

The effective rate for a cooperative transmission is:

$$R_c = \frac{1}{\frac{1}{R_1} + \frac{1}{R_2}}$$

$R_C$ is called the effective rate for a cooperative transmission since $1/R_C$ is the time required to send a information bit, without considering the MAC overhead. For R-DSTC cooperation, a group of:

$$N_{p,s} \sum_{k=1, k \neq s}^{M} A_{p,sk}$$

cooperative devices (nodes), capable of connecting with the source device at a rate greater or equal to Rp, might be collectively able to support a higher rate towards the same destination device than any of them can do separately. Note that the performance does not only depend on the number of relay devices, but also depends on the average channel quality of the relay devices. Let $q_{p,sd}$, be the channel quality of $i^{th}$ relay of source s using rate p to destination d, and let $Q_{p,sd} = [q_{p,sd,1}, q_{p,sd,2}, \ldots, q_{p,sd,s}]$, the rate supported towards station d by all the $N_{p,s}$ relays, be a function $f(R_p, N_{p,s}, Q_{p,sd})$.

Overall, assuming that the cooperative stations adopt a decode-and-forward strategy, the maximum rate the MAC can request for the overall link is:

$$\max R_c = \max_p \frac{R_p f(R_p, N_{p,z}, Q_{p,zd})}{R_p + f(R_p, N_{p,s}, Q_{p,sd})}.$$

§4.3.2 Exemplary Signaling Protocols

FIG. 4 is a flow diagram of an exemplary MAC layer protocol 400 consistent with the present invention. The network nodes discover node-to-node (e.g., source to each relay, each relay to destination) channel conditions in the wireless network. (Block 410) Then, one or more of (a) relay devices, (b) modulation schemes (source to relay, and/or relay to destination), and (c) transmission rates (source to relay, and/or relay to destination) are determined (e.g., by the source device) using the discovered channel conditions. (Block 420) At least some of the determined values (e.g., relay to destination modulation schemes, relay to destination transmission rates, etc.) are then signaled to the determined relay devices. (Block 430) Referring back to blocks 410 and 430, the discovery and signaling may use layer 2 (data link layer) signaling.

There are two kinds of basic channel access schemes, contention based access and centralized polling/scheduling based channel access. MAC protocols consistent with the present invention may work in both channel access schemes.

In a wireless network, it is costly to feed back the number of relays and channel information on the fly for each packet. This is particularly costly when there are multiple relay devices since the time used for feedback of such information increases with the number of relay devices. On the other hand, however, the performance of R-DSTC depends on the number of relay devices and the channels between the relay devices and the destination device. The underlying space-time coding and modulation scheme have to be identical among all participating relay devices for each packet transmitted. This makes it impractical to let the relays make this decision in distributed manner.

In at least some embodiments consistent with the present invention, all potential source devices (nodes) may detect and measure the average number of relay devices, and the average channel quality to these relay devices. Each device (node) listens passively to the packets sent by its neighbors and measures the received signal strength. The received signal strength can then be used to estimate the channel quality. The measurement is averaged over time so that each device (node) knows of the statistical channel information to all neighbors. By decoding the source/destination address and rate information contained in the header of the overheard packets, each device (node) can discover its two hop neighbors.

Alternatively, the one hop information used by a node can be retrieved by using an active discovery procedure with neighbor (peer) devices. The required bandwidth or channel time can be either requested by the source device (e.g., a base station). All relay devices send a pilot signal to the source device explicitly. This is at the cost of wasting extra bandwidth. All the information retrieved from the physical layer is then passed to the MAC layer and stored in a database called the "Neighbor Table".

The performance of an R-DSTC consistent with the present invention depends on the channel from the relay devices to the destination device. Since this cannot be measured locally, the source device will not be able to know such information unless it explicitly exchanges the information stored in the "Neighbor Table" between all devices (nodes). In this case, assume that the source device knows only on average how many relay devices can receive at a particular rate. By assuming that all relay devices are i.i.d uniformly distributed in a circle of a radius identical to the transmission range of the first hop rate, the average error performance can be then calculated by averaging over all possible relay device locations.

Based on the average error performance, the source device can then decide on the second hop rate without knowing the location of the relay devices. However, the performance is expected to be lower. Such a MAC is called a "neighbor count-based" R-DSTC MAC. The rate adaptation procedure should ensure that the desired loss rate can be sustained (e.g., by averaging over the locations of the relay devices).

A third rate adaptation algorithm is receiver feedback based, in which the destination device receiver measures the received signal quality. The destination device receiver then either sends a command, or the quality of the signal to the source device. The source device then adjusts the rate according to this command or measurement.

The rate adaptation could also be a hybrid method of the above mentioned methods. In a dense network, node density or neighbor count is enough to exploit the full potential of the rate adaptation; detailed channel information is not required.

Devices (nodes) can also exchange the stored information in the "Neighbor Table" with their neighbors. This can be done either by (A) periodically broadcasting the information using a control packet, (B) piggybacking the information in a data packet, or (C) exchanging the information on request by the source device (e.g., base station). Every device (node) in the network then knows the identify of its neighbors, and the average channel quality to each neighbor. The higher the frequency of information exchange, the higher the throughput, though high frequency of information exchange will increase signaling overhead. Therefore the frequency of information exchange should be adapted to network mobility.

The neighbor count based R-DSTC MAC requires less signaling overhead, but the performance is expected to be lower. The channel information based MAC uses more time for signaling, but the performance is expected to be better, since more information is available. In a dense network, the difference in performance is expected to be small and therefore channel information is no longer necessary.

When a data packet arrives at the MAC layer from a higher layer, the MAC layer inspects the "Neighbor Table". For each possible modulation and coding rate in PHY, the source device can estimate how many relay devices would be able to receive its transmitted packet. Based on this number, the source device picks a size L for the underlying STC. Ideally, L is close to the estimated number of relay devices that can actually decode the packet from the source. This ensures highest diversity (data rates) at the destination device. Using the information in the "Neighbor Table", the source device may also pick the coding and modulation schemes for use by the relay devices so that the destination device can decode the second hop transmission with high probability. By comparing all the coding and modulation schemes for both hops, the scheme that requires minimum time is used in the data packet transmission. Since the transmission time for each packet is minimized, the overall throughput for the network is maximized.

For every packet transmission, the source device may include in the header the size of the underlying space-time code, and the coding and modulation scheme needed for the second hop in the packet. Upon receiving of the data packet from the source device, each relay device may re-encode and modulate the received data according to the parameters set by the source device.

In at least some embodiments consistent with the present invention, the timing of the simultaneous transmissions from the relay devices can follow after a fixed time interval, such as the short inter-frame space ("SIFS") used in IEEE 802.11. Thus all relay devices forward in synchronization. This is because the transmissions from all participating relay devices have to be synchronized both in time and frequency. The time accuracy of the relay devices is less than the receiver's symbol duration time, and within its capability to handle the delay spread of the system. In a typical narrow band system, the symbol duration is larger than a few microseconds. In a wideband system, the current dominant physical layer solution is orthogonal frequency-division multiplexing ("OFDM"), whose symbol duration is also above a few microseconds (10 us for IEEE 802.11g and 100 us for IEEE 802.16m). One possible way to ensure synchronization in a manner consistent with the present invention is to have the relay devices transmit after a fixed time interval following packet receipt. As long as the clock speed is larger than 10 MHz, it is not difficult to guarantee accuracy to the order of 0.1 microsecond in hardware. Another possible way to ensure synchronization in a manner consistent with the present invention is to have all stations synchronized to a reference clock, such as using a Global Positioning System ("GPS") chip for example, and let the source device clearly indicate the absolute time that all relay devices should transmit.

In OFDM systems, frequency synchronization is also required. The goal is to keep the drift of the central carrier frequency under a certain threshold. This can be done in a manner consistent with the present invention by allowing one device (node), such as the access point, base station, the source device, or one of the relay devices, to send a reference carrier signal with the relay device oscillators locked to that reference carrier.

§4.4 Performance Assessment

Monte Carlo computer simulations were used to evaluate the performance of an exemplary MAC scheme consistent with the claimed invention. In the simulations, there is a base station (or more generally, a source device) at the center of the network and mobile stations (MS) are i.i.d located within a circle that has a radius of 100 meters. All stations (or more generally, devices or nodes) are equipped with one antenna and the modulation schemes supported are BPSK, QPSK, 16-QAM, 64-QAM and 256-QAM. Considering practical limitations, each station supports space-time processing up to L=6. The underlying space-time code is assumed to be orthogonal. The targeted error probability is $10^{-3}$. Symbol duration is equal to $Ts=10^{-7}$ seconds. The transmission power is such that BPSK reach to the boundary of the network.

FIG. 5 illustrates simulations of how network throughput depends on the number of relay devices under various transmission techniques. FIG. 6 illustrates simulations of how service delay depends on the number of relay devices under various transmission techniques. The results indicate that in terms of throughput and delay, R-DSTC MAC is much better compared to other MAC.

§4.5 Conclusions

Embodiments consistent with the present invention provide a method for transmitting data from a source wireless device to a destination wireless device, in which the source wireless device first transmits the data to a group of relay devices, and then each of the relay devices forward the data to the final destination using a randomized space-time coding.

The time required for the two hop cooperative transmissions may be compared to direct transmissions to determine whether or not the time for cooperative transmission is less than direct non-cooperative transmission. In some embodiments consistent with the present invention, if the cooperative transmission time is determined to be less than the direct non-cooperative transmission time, then the data is transmitted from the source device to the destination device via the intermediate relay devices; otherwise the data is transmitted directly from the source device to the destination device.

Methods consistent with the present invention may be used both in infrastructure-based networks, and in mobile ad hoc networks.

Methods consistent with the present invention may be used to reach a destination device that cannot be reached using a direct transmission from the source device.

What is claimed is:

1. A method for transmitting data from a source wireless device to a destination wireless device, the method comprising:
    a) discovering device-to-device wireless channel conditions in a wireless network including the source wireless device;
    b) determining, using the discovered device-to-device channel conditions, both (1) an estimated number of wireless relay devices to be used, cooperatively, to forward data from the source wireless device to the destination wireless device, and (2) at least one of (A) a modulation scheme to be used by the wireless relay devices to forward data from the source wireless device to the destination wireless device, or (B) a transmission rate to be used to by the wireless relay devices to forward data from the source wireless device to the destination wireless device;
    c) signaling to a plurality of wireless relay devices, randomized, distributed space-time coding control parameters, wherein the randomized, distributed space-time coding control parameters are derived from the determined estimated number of wireless relay devices to be used, cooperatively, to forward data from the source wireless device to the destination wireless device, and (2) at least one of (A) a modulation scheme to be used by the wireless relay devices to forward data from the source wireless device to the destination wireless device, or (B) a transmission rate to be used to by the wireless relay devices to forward data from the source wireless device to the destination wireless device;
    d) receiving, with each of the plurality of wireless relay devices, a transmission of the data from the source wireless device; and
    e) transmitting, with each of the plurality of wireless relay devices, a randomized, space-time encoded, part of the received data, to the destination device using the signaled randomized, distributed space-time coding control parameters.

2. A system for transmitting data from a source wireless device to a destination wireless device, the system comprising a plurality of relay devices, the system including:
    a) means for discovering device-to-device wireless channel conditions in a wireless network including the source wireless device;
    b) means for determining, using the discovered device-to-device channel conditions, both (1) an estimated number of wireless relay devices to be used, cooperatively, to forward data from the source wireless device to the destination wireless device, and (2) at least one of (A) a modulation scheme to be used by the wireless relay devices to forward data from the source wireless device to the destination wireless device, or (B) a transmission rate to be used to by the wireless relay devices to forward data from the source wireless device to the destination wireless device c) means for signaling to the plurality of wireless relay devices, randomized, distributed space-time coding control parameters, wherein the randomized, distributed space-time coding control parameters are derived from the determined estimated number of wireless relay devices to be used, cooperatively, to forward data from the source wireless device to the destination wireless device, and (2) at least one of (A) a modulation scheme to be used by the wireless relay devices to forward data from the source wireless device to the destination wireless device, or (B) a transmission rate to be used to by the wireless relay devices to forward data from the source wireless device to the destination wireless device;

d) means for receiving, with each of the plurality the plurality of wireless relay devices, a transmission of the data from the source wireless device; and e) means for transmitting, with each of the plurality of wireless relay devices, a randomized, space-time encoded, part of the received data, to the destination device using the signaled randomized, distributed space-time coding control parameters.

* * * * *